United States Patent [19]
Nguyen et al.

[11] Patent Number: 5,276,759
[45] Date of Patent: Jan. 4, 1994

[54] FLAT CABLE

[75] Inventors: Phu D. Nguyen, San Jose; Ashok K. Mehan, Union City; Hans E. Lunk, Menlo Park; James M. O'Brien, Fremont, all of Calif.

[73] Assignee: Raychem Corporation, Menlo Park, Calif.

[21] Appl. No.: 819,156

[22] Filed: Jan. 9, 1992

[51] Int. Cl.⁵ .................... G02B 6/44; H01B 7/08; H01B 13/00
[52] U.S. Cl. ........................ 385/114; 156/55; 174/117 F; 174/120 C; 174/121 R
[58] Field of Search .............. 174/117; 156/55; 385/114

[56] References Cited

U.S. PATENT DOCUMENTS

| | | | |
|---|---|---|---|
| 3,733,428 | 5/1973 | Fry | 174/72 A |
| 3,819,848 | 6/1974 | Fry | 174/72 A |
| 4,000,348 | 12/1976 | Harlow | 428/422 |
| 4,113,335 | 9/1978 | Lang et al. | 174/72 A X |
| 4,157,452 | 6/1979 | Pignataro et al. | 174/36 |
| 4,165,559 | 8/1979 | Lang et al. | 29/629 |
| 4,183,010 | 1/1980 | Miller | 367/154 |
| 4,468,089 | 8/1984 | Brorein | 174/36 X |
| 4,478,778 | 10/1984 | Look | 264/146 |
| 4,486,619 | 12/1984 | Trine et al. | 174/34 |
| 4,501,929 | 2/1985 | Escallier et al. | 174/117 F |
| 4,538,024 | 8/1985 | Wise et al. | 174/117 F |
| 4,548,661 | 10/1985 | Escallier et al. | 156/52 |
| 4,616,717 | 10/1986 | Luetzow | 174/117 F |
| 4,625,074 | 11/1986 | Cox | 174/117 F |
| 4,626,298 | 12/1986 | Allard | 174/117 F X |
| 4,639,693 | 1/1987 | Suzuki et al. | 174/117 FF X |
| 4,678,709 | 7/1987 | Tondre et al. | 428/380 |
| 4,678,864 | 7/1987 | Cox | 174/36 |
| 4,711,811 | 12/1987 | Randa | 428/383 |
| 4,715,677 | 12/1987 | Saito et al. | 385/114 |
| 4,767,891 | 8/1988 | Biegon et al. | 174/34 |
| 4,783,578 | 11/1988 | Bodensiek et al. | 174/117 F |
| 4,900,126 | 2/1990 | Jackson et al. | 385/114 |
| 4,926,007 | 5/1990 | Aufderheide et al. | 174/36 |
| 5,010,642 | 4/1991 | Takahashi et al. | 174/72 A X |
| 5,030,794 | 7/1991 | Schell et al. | 174/36 |

FOREIGN PATENT DOCUMENTS 1417209 12/1975 United Kingdom ............ 174/117 F

*Primary Examiner*—Morris H. Nimmo
*Attorney, Agent, or Firm*—Herbert G. Burkard; Sheri M. Novack

[57] ABSTRACT

This invention relates to flat cables comprising a plurality of insulated conductors bonded to a porous substrate. The porous substrate is impregnated with a polymeric material capable of bonding to the insulation of the conductors. The strength of the bond can be varied by varying the amount of the impregnant. If it is desired to separate one or more of the conductors from the substrate, for example to form a branch off, a minimum amount of impregnant can be used.

13 Claims, 2 Drawing Sheets

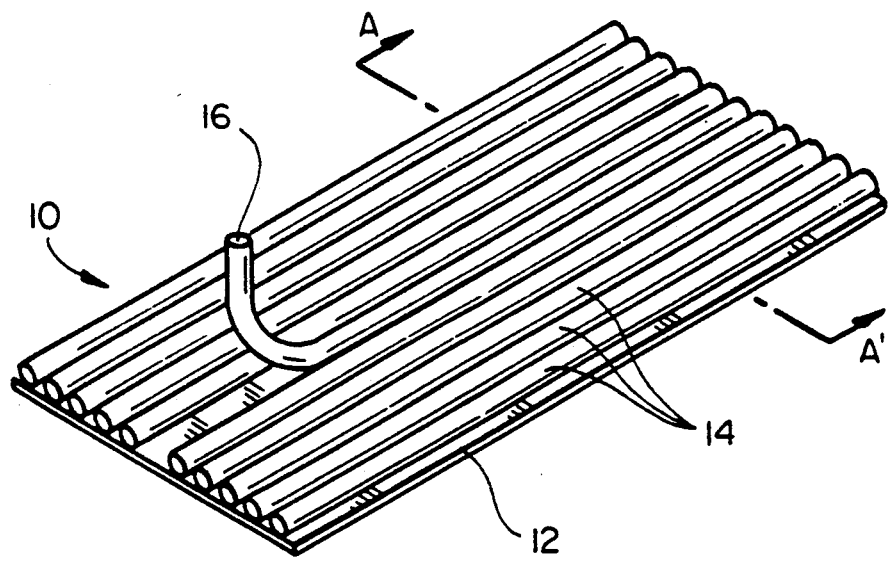
FIG_1
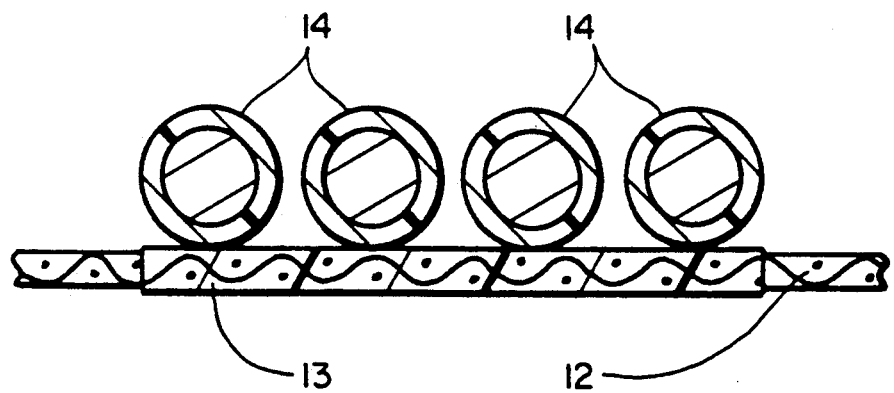
FIG_2

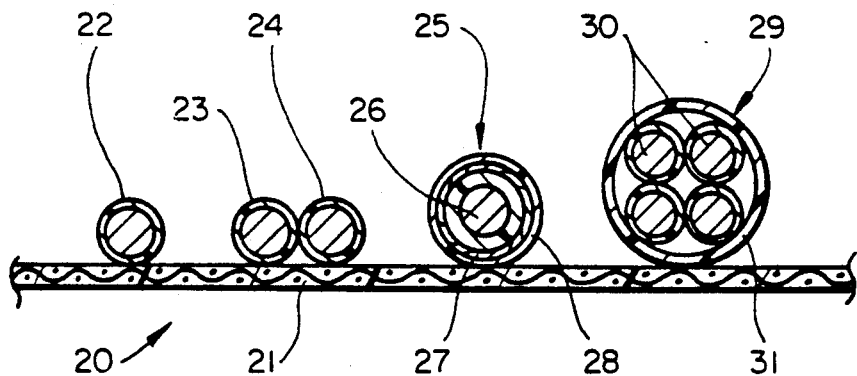
FIG_3
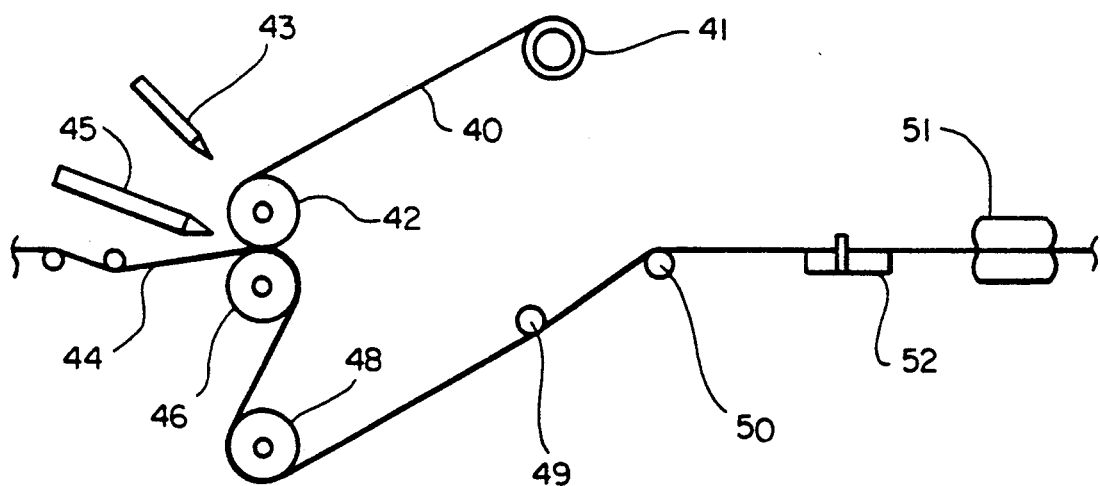
FIG_4

FLAT CABLE

BACKGROUND OF THE INVENTION

This invention relates to flat cable and in particular flat cable comprising a plurality of conductors and a porous substrate impregnated with a polymeric material.

Flat cables are well known and take several forms. In one form of flat cable a plurality of conductors are placed parallel to one another and are laminated between a pair of films which surrounds each conductor thereby insulating each conductor from its neighbors as well as forming the flat cable construction. The insulation of each individual conductor cannot always be controlled as precisely and reproducibly as desired.

Another form of flat cable addresses this issue and preinsulated conductors are bonded to a carrier film. The film is generally of a polymeric material similar to that of the insulation and in order to achieve a bond between the insulated conductors and the film, the film must be heated to about its melting point. At this temperature it is difficult to maintain the dimensions of the film and this can lead to improper alignment of the wires. Further, it has been found that with certain polymeric materials, for example polyvinylidene fluoride, the film becomes brittle when cooled following the bonding process. It is then difficult to separate an individual insulated conductor from the cable since the brittle film tends to break thereby destroying the cable. Also, the conductor generally then retains a strongly adherent residue of the brittle film. This tends to make it difficult to terminate the wire in a conventional connector. It is desirable to be able to peel the individual conductors from the film as cleanly as possible.

U.S. Pat. Nos. 4,625,074 to Cox, 4,676,891 to Biegon et al. and 4,678,864 to Cox describe attempts to obtain a flat cable having dimensional stability at elevated temperatures during the manufacture of the the cable. These patents disclose the use of a carrier film comprising a laminate of an attachment layer of a first polymeric material and a dimensional stabilization layer of a material having a higher melting point than the first polymeric material. The attachment layer and the dimensional stabilization layer are joined together with an adhesive layer. In use, the flat cable can delaminate if the cable is subject to temperatures above the melting point of the adhesive layer.

SUMMARY OF THE INVENTION

This invention provides a flat cable having dimensional stability and peelability, that is the ability to readily and cleanly separate one or more of the individual conductors from the carrier film.

One aspect of this invention comprises a flat cable comprising:

(a) a plurality of elongated conductive components each individually surrounded with outer layer of a first polymeric material; and (b) a porous substrate impregnated with a second polymeric material capable of bonding to the first polymeric material;

the conductors being arranged substantially parallel to each other and bonded to a surface of the substrate.

Another aspect of this invention comprises a method of preparing a flat cable which comprises;

(a) arranging a plurality of elongated conductive components each individually surrounded by a layer of a first polymeric material, substantially parallel to one another;

(b) providing a porous substrate impregnated with a second polymeric material which is capable of bonding to the first polymeric material;

(c) heating the conductors or the substrate or both to about the melting point of the second polymeric material;

(d) bringing the conductors in contact with the substrate;

(c) cooling the resulting assembly.

BRIEF DESCRIPTION OF THE DRAWINGS

FIG. 1 illustrates a flat cable of this invention.

FIG. 2 is an enlarged cross section of the cable of FIG. 1 taken along the line A-A'

FIG. 3 is a cross section of another cable of this invention in which a number of different types of conductors are bonded to the substrate.

FIG. 4 illustrates a method for the manufacture of the flat cable of this invention.

DETAILED DESCRIPTION OF THE INVENTION

The flat cable of this invention comprises a plurality of conductors, each individually surrounded by a layer of a first polymeric material, bonded to a porous substrate impregnated with a second polymeric material. FIG. 1 illustrates a flat cable of this invention in which each conductor comprises an insulated electrical conductor. In FIG. 1 flat cable 10 comprises a substrate 12 and individually insulated conductors 14. In FIG. 1, the conductors are identical. This is shown more clearly in FIG. 2 which is an enlarged cross section of cable 10 taken along the line A-A'. FIG. 2 shows the porous substrate 12 is impregnated with polymeric material 13.

The individual electrical conductors can be single or multiple stranded conductors. In other embodiments, one or more of the conductors comprises a twisted pair, i.e. a pair of individually insulated conductors twisted together, a cable, i.e. one or more insulated conductors within an outer jacket, including coaxial cables in which one of the conductors surrounds an inner insulated conductor. This is illustrated in FIG. 3, in which flat cable 20 comprises substrate 21 which carries an insulated wire 22, a twister pair or wires 23 and 24, a coaxial cable 25 comprising inner conductor 26, outer conductor 27 surrounded by jacket 28 and a cable 29 comprising four individual wires 30 surrounded by jacket 31.

In further embodiments of the invention, the conductor comprises an optical fiber surrounded with a layer of polymeric material (typically the jacket of a fiber optic cable). Thus, the term conductor is used herein to encompass a variety of possible arrangements of electrical conductors as well as optical fiber cables or individual optical fibers surrounded with a protective polymeric material. For the sake of convenience, the term insulated conductor is used herein to refer to any conductor or conductor arrangement surrounded by a layer of polymeric material.

The conductor is surrounded with a layer of a first polymeric material. The conductor can be surrounded by additional layers of polymeric material as long as the outer layer comprises the first polymeric material. The first polymeric material can be, for example, polyvinyl chloride, polyethylene, polyvinylidene fluoride, ethylene-tetrafluoroethylene copolymers (including terpolymers), ethylene-trichlorofluoroethylene copolymers, polyamides, in particular, aromatic polyamides, polyimides and the like. The polymeric material may be crosslinked if desired to provide improved properties, particularly at elevated temperatures.

In a preferred embodiment, the conductor is an electrical conductor insulated with an inner layer of crosslinked polyethylene and an outer layer of crosslinked polyvinylidene fluoride.

In accordance with this invention the insulated conductors are arranged parallel to one another and bonded to a porous substrate impregnated with a second polymeric material capable of bonding to the first polymeric material. The porous substrate is preferably a fabric, but it is to be understood that other porous substrates, such as an open cell foam are contemplated and are within the scope of this invention. In preferred embodiments, the substrate is a woven or spun bonded fabric impregnated throughout with the second polymeric material. Since the insulated conductors are generally bonded to one surface of the substrate, it is the surface of the substrate which must be porous and impregnated with the second polymeric material. Thus the use of a porous substrate in which only the surface is impregnated with the polymeric material, for example, by a coating process, is encompassed by the term "porous substrate" as used in this application. Similarly, substrates in which only a surface layer is porous and impregnated with polymeric material is within the scope of the term "porous substrate". In preferred embodiments, the porous substrate is a woven, non-woven or spun bonded fabric. The fabric preferably comprises natural fibers or synthetic fibers of polyester, glass, polyamide, in particular aromatic polyamide, or the like. The fibers preferably are of a material that has a melting point higher than the melting point of the second polymeric material.

The porous substrate is preferably about 10 to about 200 microns thick, more preferably about 20 to about 150 microns. Preferred fabrics are woven fabrics made of fibers having a denier of about 20 to about 2000. The nature of the weave is not critical.

The porous substrate is impregnated with a second polymeric material. The second polymeric is capable of bonding to the first polymeric material which surrounds of the conductors to be formed into the flat cable. Preferably the second polymeric material is of the same polymer as the outer layer. Preferred second polymeric materials are, for example, polyvinyl chloride, polyethylene, polyethylene terephthalate, vinylidene fluoride homopolymers and copolymers, ethylene-tetrafluoroethylene copolymers (including terpolymers), ethylene-trichlorofluoroethylene copolymers, tetrafluoroethylene-perfluoroalkoxy vinyl ether copolymers, polyamides, in particular, aromatic polyamides, polyimides and the like.

The impregnating polymeric material can be applied to the porous substrate in any convenient manner. For example, the polymeric material in the form of a solution, slurry or emulsion can be coated onto the substrate and then the substrate permitted to dry. The polymeric composition may be applied by spraying, brushing, spreading the composition over the surface of the substrate by use of a doctor blade, running the substrate through a bath of the polymeric composition or solution, slurry or emulsion of the polymeric composition. In another embodiment of the invention, the fabric is laminated between a pair of polymeric films such that the polymeric films fuse to impregnate the fabric.

The amount of impregnant should be sufficient to provide a sufficient impregnant on the surface of the porous substrate to bond the conductors to the impregnated substrate. It has been found that the amount of impregnant can be varied to provide the degree of peelability desired. In general, less impregnant results in greater peelability while more impregnant results in a stronger bond between the conductors and the substrate. It is within the skill of the art to vary the amount of impregnant to obtain the degree of bonding to the substrate desired for a particular flat cable.

While not wishing to be bound by any theory, it is believed that the advantages of the cable of this invention is due, at least in part, by a mechanical entrapment of the impregnant within the porous substrate. This also permits use of a porous substrate which is relatively imcompatible with the impregnant, i.e., a strong bond between the impregnant and the porous substrate may not be necessary. The porous substrate provides strength and dimensional stability to the cable discussed above, varying the amount of the impregnant permits peeling of one or more of the conductors from the cable without damage to the cable structure.

The cable is assembled by arranging the conductors in the desired parallel relationship. Adjacent conductors can be touching each other or spaced apart from each other, as desired. The conductors are then placed into contact with the porous substrate. The substrate and/or the the conductors are heated to about the melting point of the impregnating second polymeric material just prior to bringing the conductors and substrate into contact. Sufficient pressure is applied to effect the bonding. The amount of pressure applied should be about 1 to about 40 psi, preferably about 5 to about 20 psi. The assembly is permitted to cool.

EXAMPLE 1

The substrate for this flat cable is a woven Dacron polyester fabric, having a weight of 1.25 oz. per square yard, a denier of 10 and a 72/50 count with 400 micron openings. This fabric was impregnated with a Kynarflex ® 2801 emulsion producing a total fabric weight of 3.6 oz. per square yard, and a thickness of 4 mils. The fabric was cut to a width of 4 inches. The bonding operation was carried out in the equipment shown in FIG. 4, using the following procedure. The coated fabric 40 was paid off from a spool 41 and wound around roller 42, where it was heated to the melting temperature of the impregnant with a hot air blower 43. It was then brought in contact with 35 sets of twisted pairs of MIL-W 81044/12-20 wire, arranged horizontally in a single layer 44 touching each other. The twisted pairs were also heated by a hot air blower 45. The bonding was achieved by passing the heated fabric and the twisted pairs between rollers 42 and 46, applying a pressure of about 20 psi. The laminate was then wound around roller 48, and through a set of wire guides 49 and 50 to the caterpillar take up 51. Excess fabric on both sides was trimmed off with an in-line slitter 52. After the process, the fabric had a tear strength of 5 lbs. when tested according to ASTM D-1004.

EXAMPLE 2

Example 1 was repeated using as the substrate for the flat cable a woven fiber glass fabric, having a weight of 1.45 oz/yd$^2$, and 60/47 count with Deniers of 450 and 460 for wrap yarn and fill yarn respectively. This fabric was impregnated with Tefzel ® 280. The impregnation was done by thermally fusing two layers of 1 mil Tefzel ® film with the fabric sandwiched between them. The conditions were 500° F., and 50 psi for 30 sec. Under these conditions, Tefzel ® melted and fused together via the openings of the woven fabric producing a total substrate weight of 4.3 oz/yd2, and a maximum thickness of 6 mils. The fabric was cut to a width of 2 inches. The bonding operation was carried out using the procedure and equipment as described in example 1, except that a pressure of about 10 psi was used in the step of bonding the insulated twisted pairs to the impregnated fabric. The fabric had a tear strength of 5.5 lbs. when tested according to ASTM D-1004.

While the invention has been described herein in accordance with certain preferred embodiments thereof, many modifications and changes will be apparent to those skilled in the art. Accordingly, it is intended by the appended claims to cover all such modifications and changes as fall within the true spirit and scope o the invention.

What is claimed is:

1. A flat cable comprising:
   (a) a plurality of elongated conductive components each individually surrounded by a layer of a first polymeric material; and
   (b) a porous substrate impregnated with a layer of a second polymeric material at the interface of the first polymeric material and the porous substrate capable of bonding to the first polymeric material;
   the conductors being arranged substantially parallel to each other and bonded to a surface of the substrate.

2. A cable in accordance with claim 1, wherein the substrate comprises a fabric sheet.

3. A cable in accordance with claim 2, wherein the fabric sheet comprises a woven fabric.

4. A cable in accordance with claim 2, wherein the fabric sheet comprises a spun bonded fabric.

5. A cable in accordance with claim 2, wherein the fabric comprises natural fibers or synthetic fibers of polyester, glass or polyamide.

6. A cable in accordance with claim 1, the porous substrate is about 10 to about 200 microns thick.

7. A cable in accordance with claim 1, wherein the second polymeric material is selected from the group consisting of polyvinyl chloride, polyethylene, polyethylene terephthalate, vinylidene fluoride homopolymers and copolymers, ethylenetetrafluoroethylene copolymers (including terpolymers), ethylenetrichlorofluoroethylene copolymers, tetrafluoroethyleneperfluoroalkoxy vinyl ether copolymers, polyamides, aromatic polyamides, and polyimides.

8. A cable in accordance with claim 1, wherein at least one of said conductive components comprises an electrical conductor.

9. A cable in accordance with claim 8, wherein at least one of said conductive components comprises a single metal strand.

10. A cable in accordance with claim 8, wherein at least one of said conductive components comprises a twisted pair.

11. A cable in accordance with claim 8, wherein at least one of said conductive components comprises a cable comprising a coaxial cable.

12. A cable in accordance with claim 1, wherein at least one of the conductive components comprises an optical fiber.

13. A method of preparing a flat cable which comprises:
   (a) arranging a plurality of elongated conductive components each individually surrounded by a layer of a first polymeric material, substantially parallel to one another;
   (b) providing a porous substrate impregnated with a second polymeric material at the interface of the first polymeric material and the porous substrate which is capable of bonding to the first polymeric material;
   (c) heating the conductors or substrate or both to a temperature above the melting point of the second polymeric material;
   (d) bringing the conductors in contact with the substrate;
   (e) cooling the resulting assembly.

* * * * *